(12) United States Patent
Chan et al.

(10) Patent No.: US 7,065,639 B2
(45) Date of Patent: Jun. 20, 2006

(54) UTILIZATION OF SRAM IN AN EXECUTION OF INITIALIZATION CODE PROCESS UPON SYSTEM START UP

(75) Inventors: Yat H. Chan, Houston, TX (US); Hung Q. Phu, Friendswood, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 752 days.

(21) Appl. No.: 09/751,788

(22) Filed: Dec. 29, 2000

(65) Prior Publication Data
US 2002/0161993 A1   Oct. 31, 2002

(51) Int. Cl.
*G06F 9/24* (2006.01)

(52) U.S. Cl. .............................................. 713/2; 711/2
(58) Field of Classification Search .................... 713/1, 713/2; 711/1, 2, 100, 102, 104, 202
See application file for complete search history.

(56) References Cited

U.S. PATENT DOCUMENTS

| | | | | |
|---|---|---|---|---|
| 5,517,634 A | * | 5/1996 | Ehrlich | 711/166 |
| 5,701,478 A | * | 12/1997 | Chen | 713/2 |
| 5,835,952 A | * | 11/1998 | Yamauchi et al. | 711/157 |
| 6,222,799 B1 | * | 4/2001 | Lee | 369/30.3 |
| 6,338,100 B1 | * | 1/2002 | Ritz | 710/5 |
| 6,438,687 B1 | * | 8/2002 | Klein | 713/1 |
| 6,449,682 B1 | * | 9/2002 | Toorians | 711/100 |
| 6,601,167 B1 | * | 7/2003 | Gibson et al. | 713/2 |
| 6,636,921 B1 | * | 10/2003 | Scholhamer et al. | 710/305 |

* cited by examiner

*Primary Examiner*—Thuan Du

(57) ABSTRACT

The present invention provides a computer system with random access memory at power up and a method for providing random access memory for use by the processor during initialization of the dynamic random access memory. A static random access memory unit is provided and coupled to the processor. It is assigned memory locations which overlay a portion of read only memory address space. BIOS code and selection logic provide signals to select either the read only memory or the static random access memory so that initialization code has sufficient random access memory to operate efficiently while it initializes the dynamic random access memory.

13 Claims, 2 Drawing Sheets

UTILIZATION OF SRAM IN AN EXECUTION OF INITIALIZATION CODE PROCESS UPON SYSTEM START UP

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates to personal computers, and more particularly to a personal computer having random access memory which is functional immediately upon power up for use in system initialization.

2. Background of the Invention

Personal computers are in common use in offices and homes throughout the world. The capabilities of these machines have progressed dramatically because of increased microprocessor speed and reduced cost of random access memory, RAM. Computers with hundreds of megabytes of RAM are available to consumers at reasonable prices. The most common type of RAM now in use is dynamic random access memory, DRAM. While DRAM designs make it possible to have large fast memory units at reasonable cost, the DRAM chips must be initialized each time the computer is powered up. Before initialization, the DRAM chips will not function as memory, i.e., it is not possible to store information in, or retrieve information from, the DRAM.

The need for DRAM initialization has created a problem in personal computers at the system level. The code which initializes the DRAM is normally part of the basic input/output system, BIOS, which is stored in the system read only memory, ROM. The BIOS is what starts or boots up personal computers when power is turned on. The DRAM initialization code must be written to avoid accessing any DRAM memory locations, because during initialization the DRAM is not functional as memory. However, all computer code, including the DRAM initialization code in the BIOS, needs some RAM in which to store variables while it operates. Without some RAM available, the code will not work.

For current designs, the only RAM type memory available to the BIOS upon power up is the processor's own register files. These register files however, only provide storage for about fifty bytes. This small available storage severely limits the programmers who write the initialization code and results in awkward code. For example, nested subroutines cannot be invoked because no memory is available to hold their return addresses. Limitations are also placed on the amount of system checking which can be done. For example it is not possible to check whether all DRAM memories are properly populated and certain assumptions are normally made. It would be better to completely check the memories, but without sufficient memory available, this simply is not possible.

BRIEF SUMMARY OF THE INVENTION

A computer according to the present invention includes start up memory which is functional upon power up. This memory is mapped onto a portion of the ROM addresses which are accessible only by system software, including the BIOS DRAM initialization code. Upon system startup the DRAM initialization code can immediately use the startup memory to perform DRAM initialization in a fast and efficient manner.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name, but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
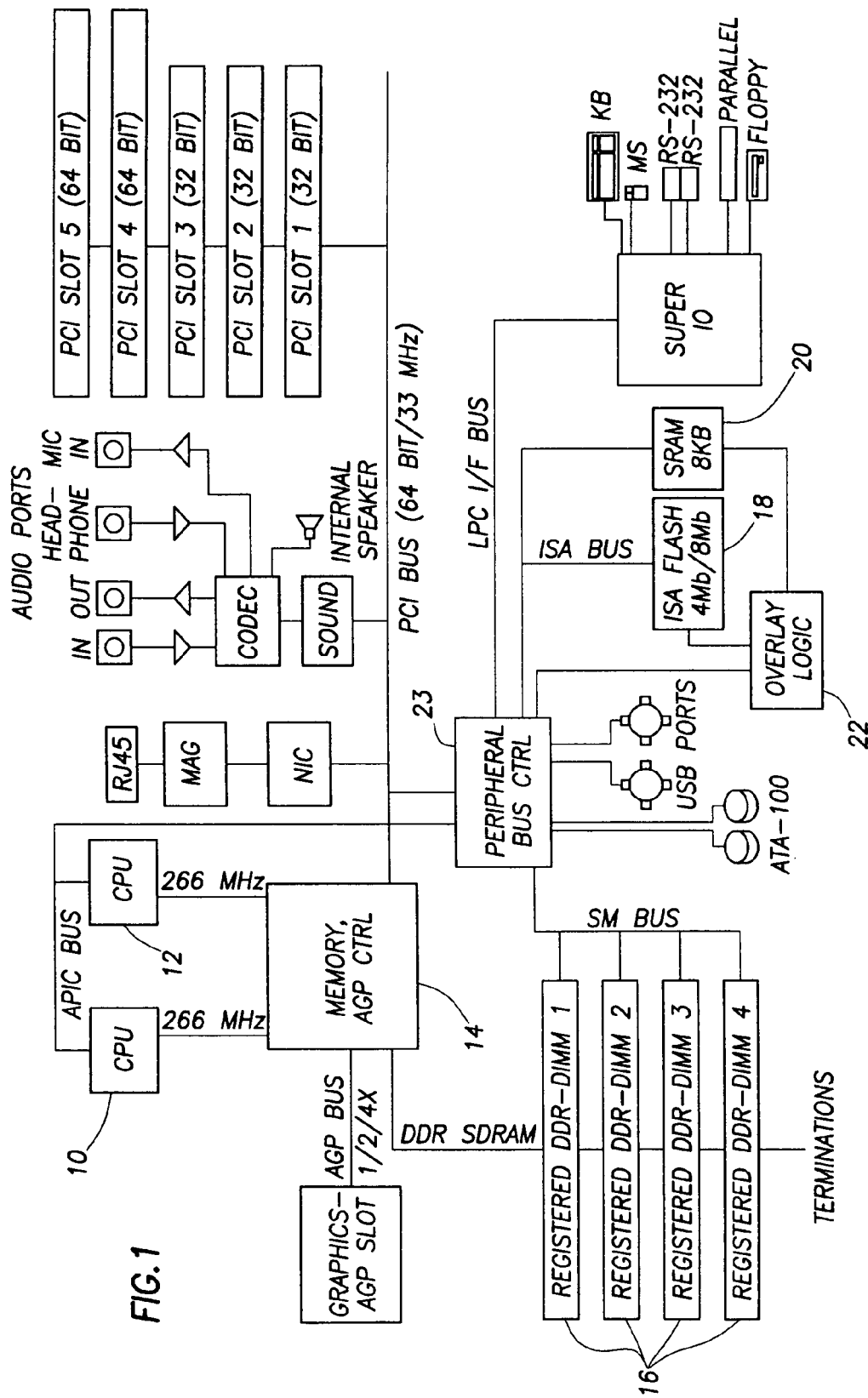
FIG. 1 is an overall block diagram of a personal computer with startup memory according to the present invention; and, FIG. 2 is a block and logic diagram of circuitry for overlaying the startup memory onto ROM address space.

With reference to FIG. 1, the overall structure of a personal computer according to the present invention will be described. In this embodiment, the computer includes two processors 10 and 12, which are part of an AMD processor system. Processors 10 and 12 are coupled through memory control unit 14 to DRAM 16, which is the primary RAM used during normal operation of the computer after startup and initialization. In the embodiment shown, the DRAM comprises four DIMMs (Double Inline Memory Modules), labeled DIMM 1 through DIMM 4.

The BIOS software needed for startup is stored in read only memory 18, which in this embodiment is an industry standard architecture flash memory device having a capacity of four megabits. This provides for storage of about 512 kilobytes for eight bit words. Eight megabit memory devices are commercially available and may be substituted if desired. Since the BIOS software also includes the DRAM initialization code, memory 18 may also be considered the initialization memory.

During startup, DRAM 16 is not available for use in running the BIOS software because it has not yet been initialized. While the flash memory 18 is suitable for storing the BIOS code, it is not suitable for storing the variables needed in running the BIOS code. Without the present invention, the BIOS code would have to be written to use only the register files in processors 10 and 12 as RAM type memory. The present invention provides startup memory 20, which in this embodiment is a static random access memory, SRAM, having a capacity of eight kilobytes, 8 KB. An overlay logic unit 22 is provided to allow addresses normally used for part of the ROM 18 to also be used for the startup memory 20. A peripheral bus control device 23, also known as a Southbridge, is part of a chip set external to, but needed for control of CPUs 10 and 12. As illustrated, it controls interactions between the CPUs and various peripheral devices such as memories 18 and 20.

Figure 2:
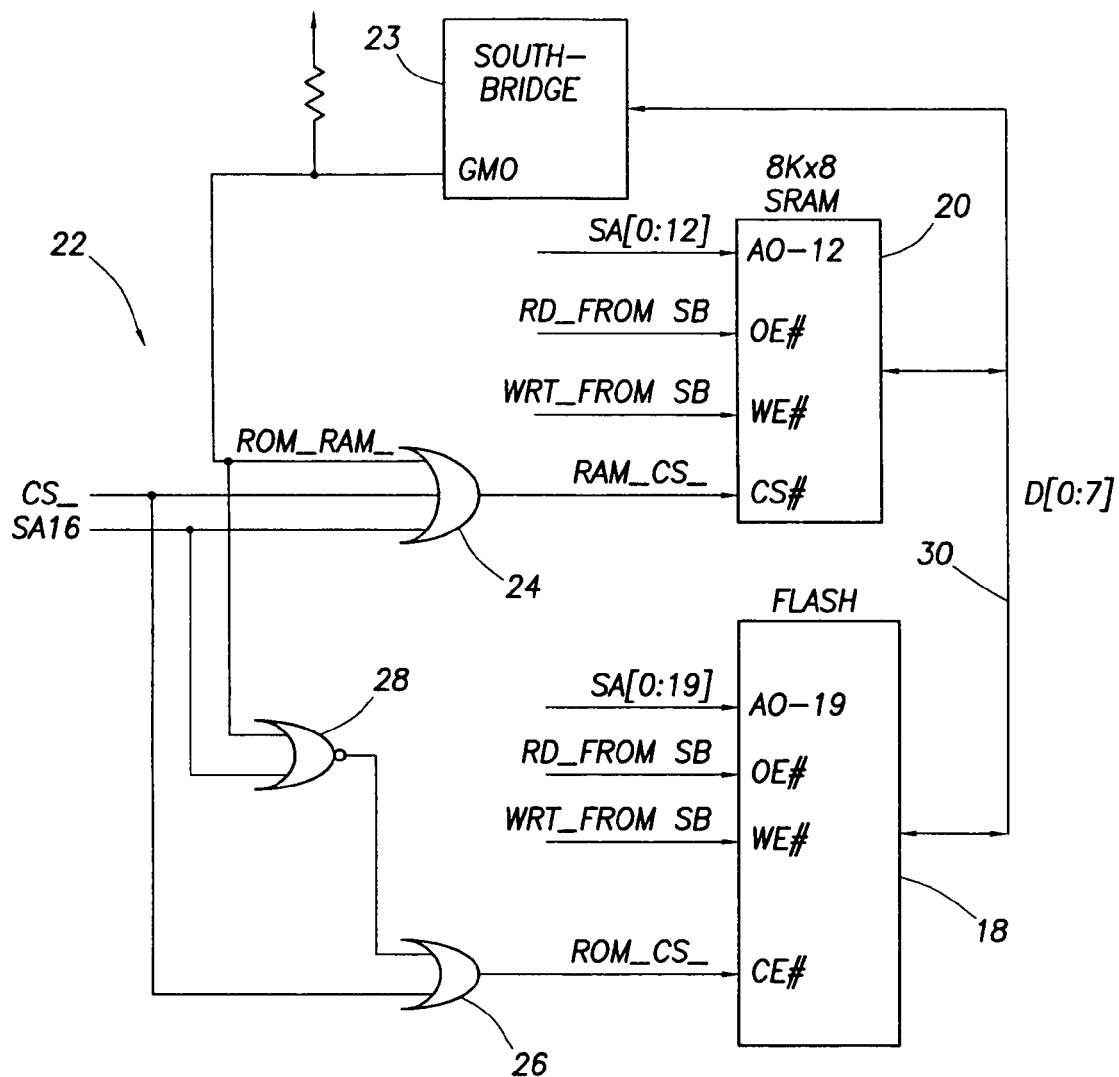

In FIG. 2, more details of the ROM 18, startup memory 20 and overlay logic 22 are illustrated. The Southbridge 23 provides the logic needed for decoding ROM address space. It provides the address command (SA) for the memory location to be accessed, the read (RD_) command, the write (WRT_) command and the chip select (CS_) command. It also provides a general purpose input/output (GPIO) at system boot up which can be controlled by the system software to provide special control signals. In the present invention this output is used to provide a command, Rom_Ram_, which selects either the ROM memory 18 or the startup memory 20. All of the commands shown in FIG. 2 are provided by the Southbridge 23. To simplify the drawing, the connecting lines have been omitted, except for the line connecting the GPIO output which provides the Rom_Ram_ command.

The overlay logic 22 decodes the signals from Southbridge 23 to select either ROM 18 or startup memory 20. The Southbridge 23 can decode a minimum of 128 KB of ROM address space from addresses FFFE0000-FFFFFFFF, which is also aliased to addresses 000E0000-000FFFFF. The Southbridge 23 asserts the CS_ (Chip Select, asserted low) signal when memory cycles are to run in this address space. By qualifying the CS_ signal with address A16_ and the Rom_Ram_ command, the address range 000E0000-000EFFFF can be accessed as either the ROM memory 18 or the SRAM memory 20. By utilizing address A16 and the GPIO signal, the address range 000E0000-000FFFFF is selectively overlaid with low cost SRAM to provide instant RAM. For the non-overlay address space ranges, FFFF0000-FFFFFFFF or 000F0000-000FFFFF, memory cycles always access the ROM 18. When the GPIO signal, ROM_RAM_, is in its default state (logic 0), the system will access the SRAM 20. The logic equations for the chip select signals for the ROM 18 and SRAM 20 are as follows:

RAM_CS_=A16#ROM_RAM_#CS_ (Equation 1)

ROM_CS_=!A16 & !ROM_RAM_#CS_. (Equation 2)

In these equations the symbol "#" is a logical "OR", the symbol "&" is a logical "AND", the symbol "!" means a logical "NOT" and the "_" following a signal name means it is asserted at low logic level.

In FIG. 2, the OR gates 24 and 26 and the NOR gate 28 perform the logic functions set out in Equations 1 and 2. The OR gate 24 provides the RAM_CS_ signal to the chip select input of SRAM 20. The OR gate 26 provides the ROM_CS_ signal to the chip enable input of ROM 18. Both memories 18 and 20 receive the same RD_ and WRT_ signals from the Southbridge 23 to control read and write cycles. Memory 18 receives address signal SA[0:19] containing twenty memory address bits. Memory 20 receives the first thirteen of these memory address bits, i.e., SA[0:12], since it has less memory locations. Both memories 18 and 20 have data outputs D[0:7] connected to the eight-bit bus 30 for reading data from, or writing data to, Southbridge 23.

The SRAM may be powered by the so-called auxiliary power rail from the system power supply. This auxiliary power is readily available from any ATX power supply. The auxiliary power rail provides power to the SRAM so long as AC power is available, that is, so long as the computer is plugged into AC power. In this way the SRAM can be kept alive even if the power switch on the computer is turned off. This feature allows information, for example screen saver information, to be stored and instantly available when the computer is next turned on.

The start up memory 20 of the present invention can also be of use after the computer has been started up and the DRAM has been initialized. The ROM memory address space is always reserved for system use only. The system software can therefore access and use the SRAM 20 at any time without conflict with applications software which uses the DRAM and operates in its separate address space. The system software can be expanded to perform value added functions which have not been available previously.

While the present invention has been illustrated and described in terms of particular apparatus and methods of use, it is apparent that equivalent parts may be substituted for those shown and other changes can be made within the scope of the present invention as defined by the appended claims.

What is claimed is:

1. A computer system comprising:
   initialization memory containing initialization code,
   a processor coupled to said initialization memory for executing said initialization code, and
   a static random access memory ("SRAM") coupled to said processor and used to store variables used by the processor while executing said initialization code;
   wherein said SRAM continues to receive power even if said system, is otheiwise powered off, said SRAM thereby being available for use by the processor without needing to subsequently be initialized when the processor executes the initialization code; and
   wherein said static random access memory is assigned addresses overlaying at least a portion of addresses assigned to said initialization memory.

2. The apparatus of claim 1 further including logic for selecting the initialization memory when the processor needs to read initialization code and for selecting the static random access memory when the processor needs to read or write to random access memory.

3. The apparatus of claim 1 further including dynamic random access memory coupled to said processor, wherein said initialization code is for initializing said dynamic random access memory.

4. The apparatus of claim 3 wherein said processor uses primarily only said dynamic random access memory when executing application code.

5. A method for operating a computer system comprising;
   providing initialization code in an initialization memory coupled to a processor;
   providing static random access memory coupled to the processor;
   assigning addresses to said static random access memory that overlay at least a portion of addresses assigned to the initialization memory;
   providing power to said static random access memory even if the computer system is otherwise powered off; and
   executing the initialization code in the processor while using the static random access memory to store and retrieve variables needed by the code without having to initialize the static random access memory.

6. The method of claim 5 wherein said computer system includes dynamic random access memory and said initialization code is for initializing said dynamic random access memory.

7. The method of claim 6 further including using primarily only said dynamic random access memory when executing application code in said processor.

8. A computer system comprising:

dynamic random access memory, initialization memory containing initialization code for initializing the dynamic random access memory at system startup, and a static random access memory functional before and at system startup for storing variables used for initializing the dynamic random access memory;

wherein said static random access memo is assigned addresses overlaying at least a portion of address space assigned to said initialization memory.

9. The system of claim 8, further including:

a processor coupled to said initialization memory for executing said initialization code upon system startup and coupled to said static random access memory for use in executing said code.

10. The system of claim 9 wherein said processor is coupled to said static random access memory after system startup for use in executing system code other than said initialization code.

11. The system of claim 8 further including means for selecting said static random access memory when said processor is executing said initialization code.

12. A computer system comprising:

dynamic random access memory, initialization memory containing initialization code for initializing the dynamic random access memory at system startup, a processor coupled to said initialization memory for executing said initialization code, a static random access memory coupled to said processor and used to store variables used for initializing the dynamic random access memory while executing said initialization code, said static random access memory connected to and powered by a system power supply which remains active whenever AC power is supplied to the computer system and wherein said static random access memory is assigned addresses overlaying at least a portion of the addresses assigned to said initialization memory.

13. The apparatus of claim 12 further including logic for selecting the initialization memory when the processor needs to read initialization code and for selecting the static random access memory when the processor needs to read or write to random access memory.

\* \* \* \* \*